(12) United States Patent
Paynter et al.

(10) Patent No.: US 8,261,890 B2
(45) Date of Patent: Sep. 11, 2012

(54) BRAKE ASSEMBLY WITH BRAKE SHOE AND BRAKE LINING PLATE, AND ASSOCIATED METHOD

(75) Inventors: Scott Paynter, Kitchener (CA); William Dickson, Brampton (CA); Frank Ordogh, Thornhill (CA)

(73) Assignee: MBN Automation Ltd., Concord (CA)

( * ) Notice: Subject to any disclaimer, the term of this patent is extended or adjusted under 35 U.S.C. 154(b) by 578 days.

(21) Appl. No.: 12/448,298

(22) PCT Filed: Dec. 14, 2007

(86) PCT No.: PCT/CA2007/002269
§ 371 (c)(1),
(2), (4) Date: Jun. 12, 2009

(87) PCT Pub. No.: WO2008/070997
PCT Pub. Date: Jun. 19, 2008

(65) Prior Publication Data
US 2010/0025171 A1 Feb. 4, 2010

Related U.S. Application Data

(60) Provisional application No. 60/874,943, filed on Dec. 15, 2006, provisional application No. 60/929,844, filed on Jul. 13, 2007.

(51) Int. Cl.
*F16D 65/04* (2006.01)
(52) U.S. Cl. ............ 188/250 B; 188/250 D; 188/250 G; 188/250 C; 188/234
(58) Field of Classification Search ............... 188/250 C, 188/250 B, 250 D, 250 G, 242, 244, 245, 188/246, 234; 192/107 T, 70.13, 70.19
See application file for complete search history.

(56) References Cited

U.S. PATENT DOCUMENTS

| | | | |
|---|---|---|---|
| 1,592,273 A | 7/1926 | Kelly | |
| 1,682,319 A | 8/1928 | Bluhm | |
| 1,729,140 A * | 9/1929 | Thompson | 188/234 |
| 1,781,074 A | 11/1930 | Norton | |
| 1,937,140 A | 11/1933 | Blume | |
| 2,067,677 A | 1/1937 | Murphy | |
| 2,291,525 A * | 7/1942 | Bessey | 188/242 |
| 2,541,978 A | 2/1951 | Amundsen | |
| 2,541,979 A * | 2/1951 | Amundsen | 192/107 T |

(Continued)

FOREIGN PATENT DOCUMENTS

GB 2073834 10/1981

(Continued)

*Primary Examiner* — Robert A Siconolfi
*Assistant Examiner* — Mariano Sy
(74) *Attorney, Agent, or Firm* — Thomas Adams

(57) ABSTRACT

A brake assembly of the type having a brake shoe platform and one or more brake plates mounted on the platform, each brake plate having a brake lining and a backing plate attachable to an outer surface of the platform, is characterized in that the platform has a series of circumferentially spaced apertures each adjacent its rear edge, and a series of circumferentially spaced recesses communicating with its front edge. The backing plate has two rear flanges each being L-shaped and having an inner portion depending from its inner surface and a rearwardly projecting outer tongue portion, these rear flanges being sized to pass through the apertures in the brake shoe platform. Also, the backing plate has two front flanges, each having an inner portion depending from its inner surface and an outer tongue portion, these front flanges being arranged to slide into the recesses at the front edge of the platform.

36 Claims, 5 Drawing Sheets

U.S. PATENT DOCUMENTS

| | | | |
|---|---|---|---|
| 2,879,688 A | | 3/1959 | Badgley |
| 2,879,866 A | | 3/1959 | Newell |
| 3,467,229 A | | 9/1969 | Deibel |
| 3,891,069 A | | 6/1975 | Lawrence |
| 3,941,222 A | | 3/1976 | Newstead |
| 4,501,347 A | | 2/1985 | Cerny et al. |
| 4,569,424 A | | 2/1986 | Taylor |
| 4,588,050 A | | 5/1986 | Urban |
| 4,771,870 A | | 9/1988 | Belk |
| 5,119,909 A | * | 6/1992 | Shim ............... 188/245 |
| 5,139,114 A | | 8/1992 | Rodriguez et al. |
| 5,255,762 A | | 10/1993 | Beri |
| 5,261,512 A | * | 11/1993 | Young ............. 188/250 B |
| 5,429,215 A | * | 7/1995 | King ............... 188/250 C |
| 5,469,942 A | * | 11/1995 | Krumm, Sr. ..... 188/250 G |
| 5,636,717 A | * | 6/1997 | Cardenas ......... 188/250 G |
| 5,836,428 A | * | 11/1998 | Young ............. 188/250 G |
| 5,839,550 A | | 11/1998 | Redgrave et al. |
| 5,941,349 A | * | 8/1999 | Krumm, Sr. ..... 188/250 G |
| 5,975,255 A | * | 11/1999 | Monroe et al. .... 188/250 D |
| 6,520,301 B2 | | 2/2003 | Young |
| 6,793,045 B2 | | 9/2004 | Matsueda et al. |
| 6,983,831 B2 | | 1/2006 | Beri |
| 2007/0051572 A1 | * | 3/2007 | Beri ............... 188/250 B |

FOREIGN PATENT DOCUMENTS

| | | |
|---|---|---|
| WO | 98/27358 | 6/1998 |
| WO | 2005/035328 | 4/2005 |
| WO | 2006/078534 | 7/2006 |

* cited by examiner

BRAKE ASSEMBLY WITH BRAKE SHOE AND BRAKE LINING PLATE, AND ASSOCIATED METHOD

CROSS-REFERENCE TO RELATED APPLICATIONS

This application is a national entry of International patent application No. PCT/CA2007/002269 which claims priority from U.S. Provisional patent application No. 60/874,943 filed Dec. 15, 2006 and U.S. Provisional patent application No. 60/929,844 filed Jul. 13, 2007. The entire contents of each of these three applications are incorporated herein by reference.

TECHNICAL FIELD

The present invention relates to vehicle brake shoe and lining assemblies, especially for the drum brakes of heavy vehicles such as trucks and buses, and to associated methods of assembling them onto existing brake shoes. The invention may, however, also have application to brakes of the type used for example for railway wheels, where a brake shoe with a cylindrically curved concave brake lining applies this to the external surface of a wheel.

BACKGROUND ART

The commonest type of brake shoe and lining assembly for drum brakes is a brake shoe having a convex, cylindrically curved platform, on the outside of which is attached a replaceable brake lining, usually held in place by rivets.

The use of rivets to attach the brake lining has drawbacks. The riveting procedure usually means that the brake shoe with the lining has to be removed from the vehicle for replacement of the lining. Also, when the lining becomes worn, there is the danger of metal-to-metal contact between the rivets and the brake drum, which is damaging to the drum and seriously reduces braking efficiency.

The prior art includes various designs and proposals for using replaceable brake lining parts in the form of so-called brake plates or brake lining blocks, which include a brake lining fixed to a metal backing plate; such a combination may be attached to the brake shoe more easily than the linings themselves, for example with reusable screws or bolts. Early examples of this type of prior art are shown in the following patents:

U.S. Pat. No. 1,682,319, issued Aug. 28, 1928 to Bluhm, is an early example of such construction, in which cylindrically curved metal plates have brake linings cemented thereto. The linings terminate short of uncovered end portions of the plates, these end portions having holes for receipt of rivets or screws whereby the plates can be connected to an underlying brake shoe platform.

U.S. Pat. No. 2,879,866, issued Mar. 31, 1959 to Newell, shows the use of a brake plate assembly, comprising a metal plate and a brake lining, designed for braking railway wheels, and which can be connected to an exterior brake shoe by rivets.

Several patents indicate that the combination of friction material and metal backing plate may provide an assembly which allows a brake lining to be changed without removing the brake shoe from the vehicle, or, in some cases, without removing either the brake drum or the brake shoe. This can considerably reduce the time needed for replacement of brake linings. Such constructions are shown in the following U.S. patents:

U.S. Pat. No. 3,467,229, issued Sep. 16, 1969 to Deibel;
U.S. Pat. No. 3,941,222, issued Mar. 2, 1976 to Newstead, and
U.S. Pat. No. 4,771,870, issued Sep. 20, 1988 to Belk.

In Deibel, the metal backing plate of the brake plate, to which the brake lining is attached, has inwardly projecting stud members which can slide into axial slots in the brake shoe platform, the brake plate being secured by nuts applied to the stud members inside the brake shoe platform.

In Newstead, the backing plate of each brake plate has integrally formed downwards projections some of which are right angled, and some of which have tongues inside of and parallel to the backing plate. The projections are inserted into apertures in the brake shoe platform, with the tongues engaging the underside of the platform. The brake plate is held in position by fasteners which connect the right-angled projections to the brake shoe.

In Belk, the backing plate has internal nuts welded thereto, which receive bolts connected to flange members of the brake shoe.

Other prior patents include:
U.S. Pat. No. 4,569,424, issued Feb. 11, 1986 to Taylor, which shows threaded bosses in the backing plate which receive fasteners inserted through the brake shoe platform:

U.S. Pat. No. 5,255,762, issued Oct. 26, 1993 to Beri, which shows a construction somewhat similar to that of Belk, in which the threaded bosses are provided by nuts secured to the backing plate, and U.S. Pat. No. 6,983,831, issued Jan. 20, 2006 to Beri, and corresponding Canadian Patent Application No. 2,542,346, show brake plates in which the corners of the backing plate are held clear of lining material and have bores for rivets whereby they are connected to the brake shoe platform; the backing plate and platform also have further locating and attachment means.

The present invention seeks to overcome, or at least ameliorate, one or more of the disadvantages of these known brake shoe and lining assemblies, and methods of assembling same, or at least provide an alternative.

DISCLOSURE OF INVENTION

The present invention provides a construction in which, like those of Deibel, Newstead and Belk, there is no need for the brake shoe to be removed for replacement of a brake lining; and in at least some embodiments it may also be unnecessary for the brake drum to be removed. The construction allows easy replacement of the brake linings, and attaches these to the brake shoes in a secure manner. In one embodiment, it allows the brake linings to be replaced without removal of either the brake shoe or drum, and also without use of any attachment means such as rivets screws or nuts.

In accordance with one aspect of the invention, a brake assembly of the type having a brake shoe with a generally cylindrically curved platform, and one or more brake plates mounted on the platform, both the platform and the brake plate or plates having generally cylindrically curved front and rear edges, the brake plate or plates each including a brake lining and a backing plate, with the backing plate having an outer surface secured to the lining and having an inner surface attachable to an outer surface of the brake shoe platform, is characterized in that:

the brake shoe platform has a series of circumferentially spaced apertures each adjacent to and spaced inwardly of the rear edge of the platform, and also has a series of circumferentially spaced recesses communicating with the front edge of the platform, and in that each backing plate has:

a) two rear flanges adjacent the rear edge thereof, each rear flange being L-shaped and having an inner portion depending from the inner surface of said backing plate and a rearwardly projecting outer tongue portion generally parallel to an adjacent area of the backing plate, both said portions being sized to pass through said apertures in the brake shoe platform; and b) two front flanges adjacent the front edge thereof, each front flange having an inner portion depending from the inner surface of the backing plate and sized to be received in one of said recesses at the front of the platform, and an outer tongue portion generally parallel to an adjacent area of the backing plate;

whereby the brake plate can be assembled to the brake shoe platform by passing said rear flanges through the said apertures in the brake shoe platform and sliding said brake plate rearwardly until said rear flange outer tongue portions underlie rear edge portions of the platform, while said front flange inner portions enter said recesses communicating with the front edge of the platform and so that said outer tongue portions of the front flanges underlie front edge portions of the platform.

Reference to the rear flange portions being sized to pass through the apertures may means that they fit closely within the apertures, but may also merely mean that they are small enough to pass through the apertures. In some cases (see below) a single aperture may be large enough to accommodate the adjacent flanges of two abutting backing plates.

In the usual type of installation, where the brake shoes are inside a brake drum, the "outer surface" of the backing plate will be the convex surface, while the inner face will be the concave surface. However, where the brake shoes surround a cylindrical object, such as a railway wheel, the "outer surface" of the backing plate will be the concave surface and the "inner surface" will be the convex surface attached to the platform. In other words, "inner" and "outer" surfaces as used herein are to be understood in relation to which surface is attached to the platform and which to the brake lining, the "inner" surface being that attached to the platform.

Preferably the front flanges have their inner portions generally perpendicular to the generally cylindrical surface of the brake shoe platform and are parallel to an axis of curvature of the brake shoe platform, and the said recesses communicating with the front edge of the platform are axial slots into which said front flange inner portions can slide to locate the brake plate circumferentially on the shoe.

The rear flange outer tongue portions, while generally parallel to the axis of curvature of the backing plate, may slope downwardly and outwardly relative to this axis, and the rear flanges may be dimensioned so as to provide a wedging action under the outer edge portions of the platform, which action holds the backing plate tightly connected to the platform when assembled in place. Such a construction can allow the brake plate or plates to be installed without the need for any fasteners. Alternatively, however, at least one of the front flanges of the backing plate and a corresponding front edge portion of the platform can be provided with aligned bores for receipt of fastener means, such as screws, so that the brake plates can be installed with at least one fastener holding the front flanges to the platform, but without the need for fasteners for said rear flanges.

The backing plate may have at least one internally projecting key, and the brake shoe platform may have a slot which accommodates this key or keys when the brake plate is in position.

In accordance with another aspect of the invention, a brake assembly of the type having a brake shoe with a generally cylindrically curved platform, and one or more brake plates mounted on the platform, both the platform and the brake plate or plates having generally cylindrically curved front and rear edges, the brake plate or plates each including a brake lining and a backing plate, with the backing plate having an outer surface secured to the lining and having an inner surface attachable to an outer surface of the brake shoe platform, is characterized in that:

the brake shoe platform has a series of first bolt-receiving bores adjacent the rear edge thereof and a series of second bolt receiving bores adjacent the front edge thereof, the shoe also having a series of apertures each associated with one of said first bolt-receiving bores and each spaced inwardly of one of the first bolt-receiving bores, and in that each backing plate has:

a) two rear flanges adjacent the rear edge thereof, each rear flange being L-shaped and having an inner portion depending from the inner surface of the backing plate and a rearwardly projecting outer tongue portion generally parallel to an adjacent rear portion of the backing plate, both said flange portions being sized to pass through the apertures in the brake shoe platform; and b) two front flanges adjacent the front edge thereof, each front flange having an inner portion depending from the inner surface of the backing plate and an outer tongue portion generally parallel to an adjacent front edge area of the backing plate;

and wherein said outer tongue portions of both the rear and front flanges have screw threaded bores adapted to receive bolts inserted through said bolt receiving bores in the brake shoe platform, so that the brake plate can be assembled to the shoe by passing the rear flanges through the said apertures in the brake shoe platform and locating rear flange outer portions under rear edge portions of the brake shoe platform while locating front flange outer tongue portions on the underside of the front edge area of the platform, and securing all the flanges to the brake shoe platform by means of screws passed through the bores in the brake shoe platform and which pass into said screw threaded bores in the flange outer tongue portions.

In this latter construction, all of the flanges are preferably integrally formed with the backing plate.

The three-dimensional radius geometry of the shoe platform and the width of the outboard rear slots may vary as a function of the shoe table material thickness to allow for the projected path of the backing plate as it is inserted into the slot. As a result, any movement of the backing plate when the shear load is applied in alternating directions may, with repeated use, result in damage and/or failure of the brake plate and shoe platform.

This is addressed in preferred embodiments of the various aspects of the invention, by providing the brake shoe platform with at least one axially extending abutment positioned so as to lie close to one end edge of a brake plate when in place on the platform, so as to resist circumferential forces on the brake plate. In a preferred arrangement, a pair of brake plates is used with their adjacent end edges butted together, and the platform is provided with two axially extending abutments located on opposite end edges of the pair of brake plates so as to resist circumferential forces.

In embodiments of the foregoing aspects of the invention, both the front and rear of the brake plates have flange portions underlying front and rear areas of the brake platform and attached thereto by screws which hold the flanges against the underside of the brake platform. It has been found that the sheet material for the brake platform varies in thickness; if this is too thin the screws, particularly at the front tend to lift the brake plates off the outer surface of the shoes, causing looseness in the structure. A further aspect of the invention seeks to at least mitigate this possible limitation and to ensure good contact between at least a major part of the brake plate and the brake shoe, in spite of variations in the brake shoe thickness.

According to this further aspect of the invention, there is provided a brake assembly of the type having a brake shoe with a generally cylindrically curved platform, and at least one brake plate mounted on the platform, both the platform and the brake plate having generally cylindrically curved front and rear edges, the brake plate including a brake lining and a backing plate, with the backing plate having an outer surface secured to the lining and having an inner surface attachable to an outer surface of the brake shoe platform, characterized in that:

said brake shoe platform has a circumferentially spaced series of apertures each adjacent to and spaced inwardly of said rear edge of said platform, and has a series of bolt receiving bores each adjacent a rear edge of one of said apertures, said brake shoe platform also has two axially extending abutments adjacent the outer ends of the platform and positioned to lie adjacent outer side edges of the said brake plate when in position on said platform, and in that said backing plate has two rear flanges adjacent said rear edge thereof, each rear flange being L-shaped and having an inner portion depending from the inner surface of said backing plate and a rearwardly projecting outer tongue portion generally parallel to an adjacent area of the backing plate and connected to the inner portion by a curved junction portion, said rear flanges being sized to pass through said apertures in the brake shoe platform, said outer tongue portions of said rear flanges having screw threaded bores adapted to receive bolts inserted through said bolt receiving bores in the brake shoe platform.

whereby said pair of brake plate can be assembled to the brake shoe platform by passing said rear flanges through the said apertures in the brake shoe platform and sliding said brake plate rearwardly until said rear flange outer tongue portions underlie respective rear edge portions of the platform and said curved junction portions engage respective juxtaposed edges of the associated apertures to form respective pivots, and securing said rear flanges to said platform by means of screws passed through the bores in the flange outer tongue portions, the arrangement being such that tightening of the screws to draw the rear flange outer tongue portions towards said rear edge portions of the platform urges the frontal portion of the brake plate towards the frontal portion of the platform with sufficient force to hold the brake plate without additional front connectors.

Embodiments of this further aspect of the invention may dispense with not only the front attachment screws but also the front flanges and rely solely upon the force exerted by the screws securing the rear flanges to fasten the brake plate to the brake shoe platform.

Embodiments of this further aspect of the invention may comprise two such brake plates, each having the same construction.

An advantage of using only the rear flanges to fasten the brake plates is that dimensional variations between different brake shoes are less critical, especially when retro-fitting brake plates and linings to an existing brake assembly, because the thickness of the shoe platform may vary from one manufacturer to another, and/or as a result of steel mill manufacturing tolerances, especially where the brake shoes are made from a stock metal that has been rolled rather than cast, and/or for reasons of cost.

According to another aspect, the invention comprises a method of adapting a brake shoe platform for use with the brake plates of the foregoing aspects of this invention.

BRIEF DESCRIPTION OF THE DRAWINGS

Preferred embodiments of the invention will now be described by way of example only and with reference to the accompanying drawings, in which.

DETAILED DESCRIPTION OF PREFERRED EMBODIMENTS

Figure 1:
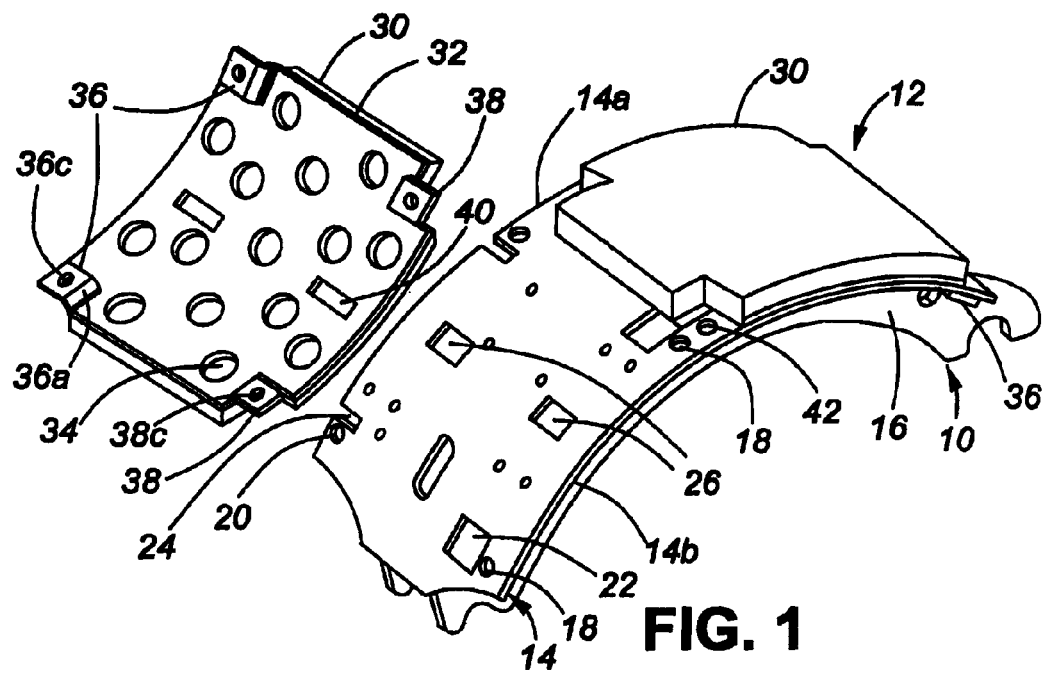
FIG. 1 is a perspective view showing an assembly in accordance with the invention and including a brake shoe with one brake plate installed and another brake plate separated from the shoe.

Referring to the drawings, a brake shoe 10 is shown of the type commonly used inside a brake drum (not shown). This brake shoe 10 normally accommodates two brake plates 12; however, the invention may apply to cases where only one brake plate is carried by one brake shoe.

As shown, the brake shoe 10 has a platform 14 which is cylindrically curved, the interior of which is supported by two curved flanges 16 connected to brake actuators, not shown. The platform 14 has a front edge 14a, normally facing the outside of a vehicle, and a rear edge 14b normally facing the interior of the vehicle. Adjacent the rear edge 14b is a series of first circumferentially spaced bores 18, and adjacent the front edge 14a is a series of second circumferentially spaced bores 20, each axially aligned with one of the first bores 18. Adjacent each first bore 18, and axially aligned therewith, is an aperture 22 which is generally rectangular but which has sides which converge inwardly towards the rear at a small angle so that the rear edges of these apertures are narrower than the front edges. Beside each second bore 20 is a recess in the form of an axial slot 24 which communicates with the front edge of the platform 14. Between each of the apertures 22 and each of the slots 24, and spaced inwardly of the front and rear edges of the platform, is an axial slot 26, the slots 26 being aligned with each other. The platform has some additional apertures for cooling purposes which are conventional and need not be described.

The brake plate 12 has a conventional brake lining material 30 which is bonded to a cylindrically curved metal backing plate 32, preferably of 3/16 inch thick steel. The plate 32 has a pattern of apertures 34, and the material 30 is a resin-based lining material having such a composition that it can be moulded onto the plate 32 in a manner which allows the lining material to flow into these apertures to give a strong bond onto the plate.

The lining material 30 is recessed at its corners, and each corner of the plate 32 is provided with an L-shaped flange, including two rear flanges 36 and two front flanges 38.

Figure 2:
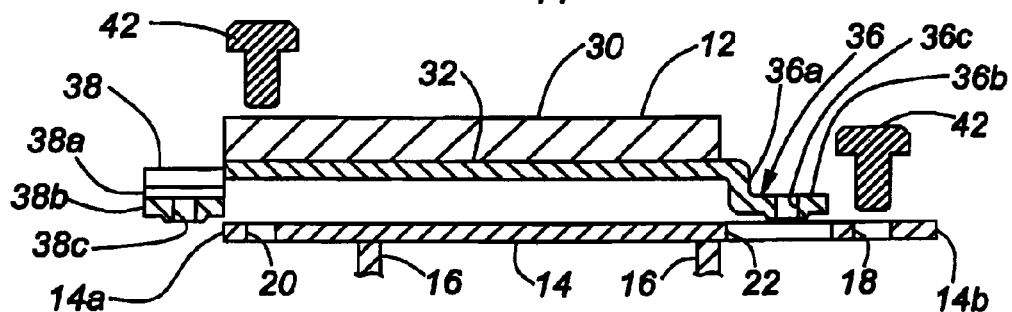
FIG. 2 is a sectional view taken axially and radially of the brake shoe platform and of a brake plate in the process of being installed.
Figure 3:
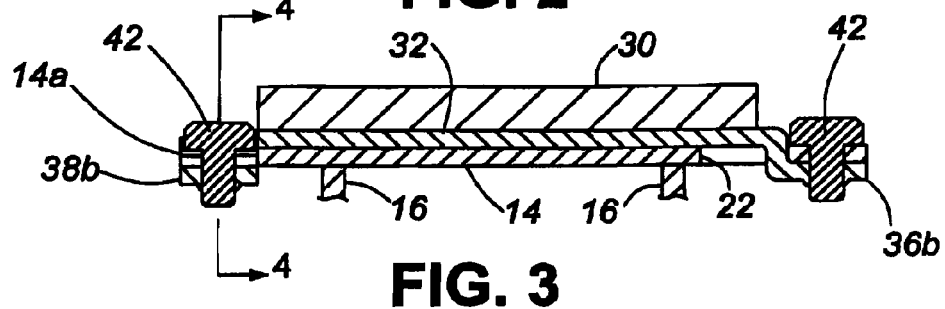
FIG. 3 is a view similar to FIG. 2 with the brake plate in its installed position.

The rear flanges 36, as best seen in FIGS. 2 and 3, each have an inner portion 36a depending perpendicularly from the inner surface of the plate and an outer, rearwardly projecting tongue portion 36b which is generally parallel to the adjacent surface of the plate 32, but which nevertheless slopes downwardly and outwardly at a small angle of about 2° to 8° relative to the axis of curvature of the plate, as can be seen in FIG. 2. These flanges are such that, when the brake plate 12 is applied to the platform 14 in the procedure illustrated in FIGS. 2 and 3, each tongue 36 passes through an aperture 22 and its outer portion 36b becomes wedged under the portion of the platform 14 between an aperture 22 and the rear edge 14b of the platform. The width of the inner portion 36a is matched to the width of the outer edge of the aperture 22 so as to be tightly wedged in place between the converging sides of the aperture when in final position. To ensure proper tolerances and provide a good fit of these parts, both the flanges 36 are formed in a single operation.

Figure 4:
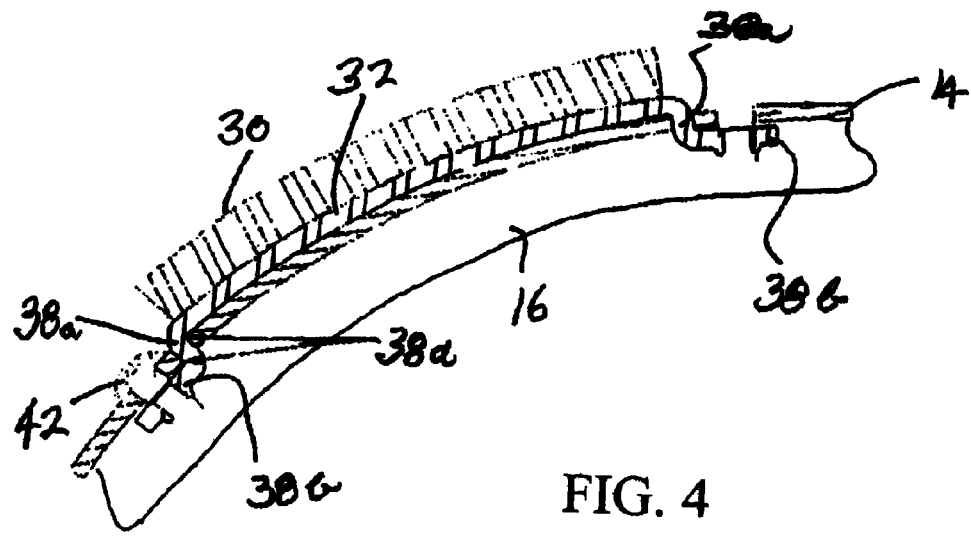
FIG. 4 is a front sectional view of the assembly on lines 4-4 of FIG. 3.
Figure 5:
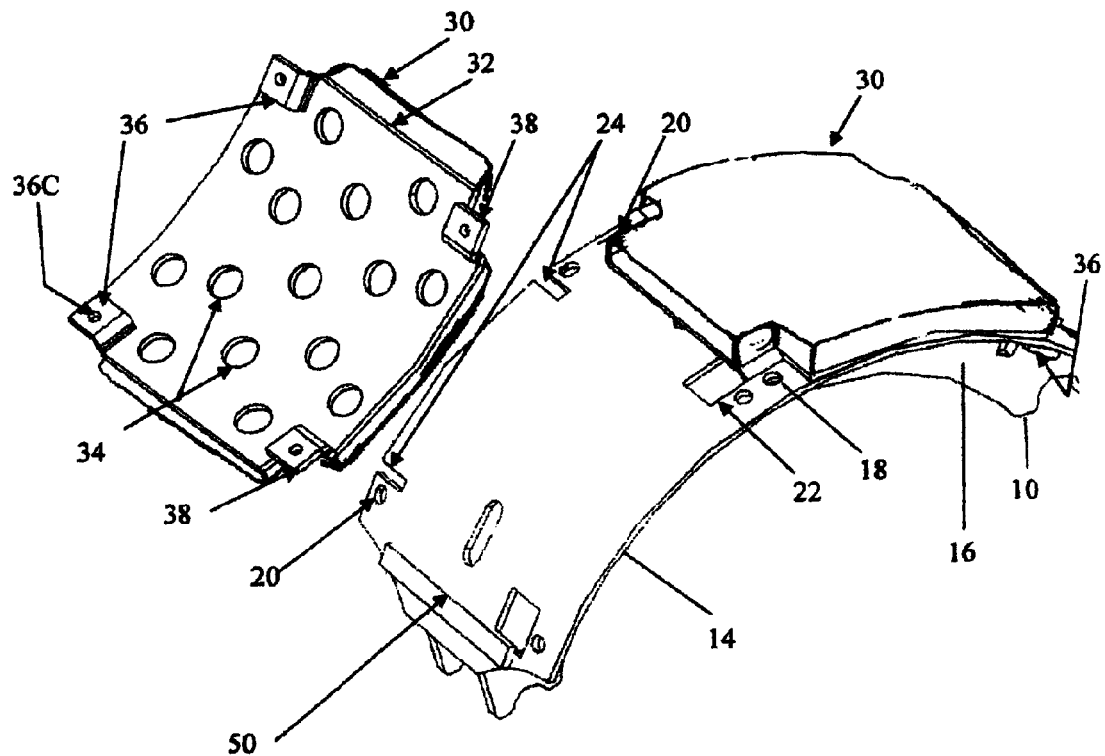
FIG. 5 is a perspective view of a second embodiment of the invention.
Figure 6:
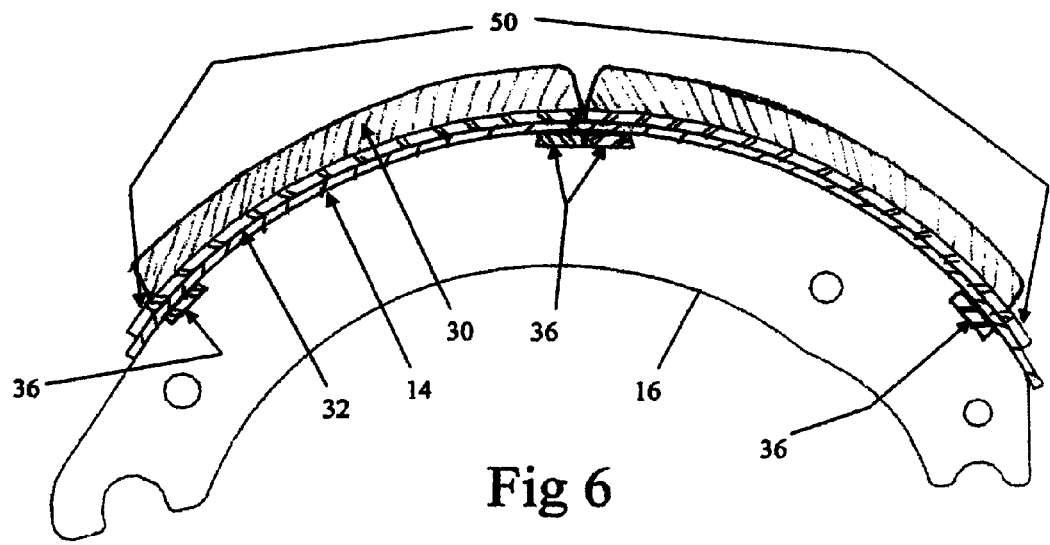
FIG. 6 is a view on the rear side of the embodiment of FIG. 5, viewed axially of the brake shoe.
Figure 7:
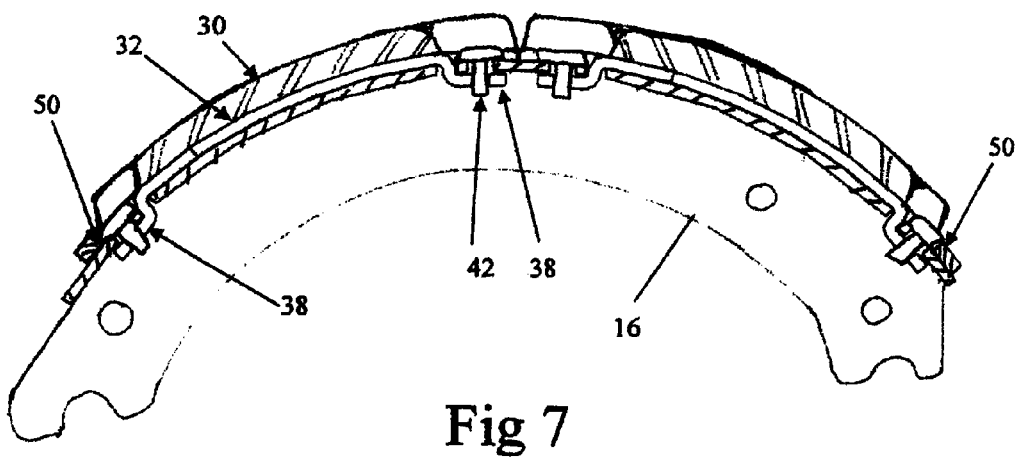
FIG. 7 is an axial view on the front side of the FIG. 5 embodiment.
Figure 8:
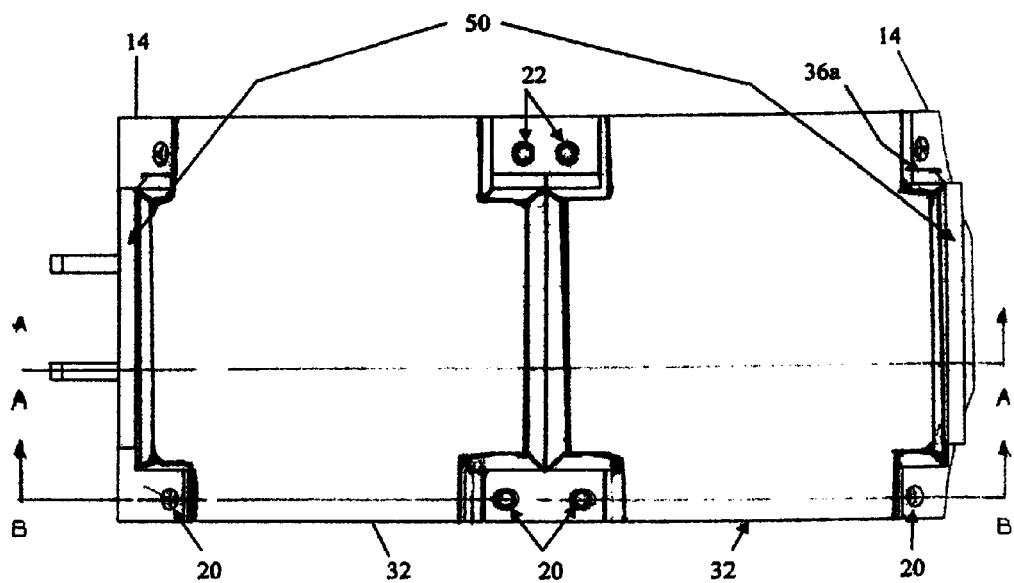
FIG. 8 is a top plan view of the second embodiment of brake shoe.

At the front edge of the plate 32, the front flanges 38 each have an inner portion 38a depending generally perpendicularly from the inner surface of the plate 32 and being orientated parallel to the axis of curvature of this plate, and each have an outer tongue portion 38b projecting circumferentially of the backing plate and being parallel to the adjacent area of the backing plate and located to fit snugly under the front edge portion of the platform 14, as illustrated in FIGS. 3 and 4. The inner portion 38a is dimensioned to be a close sliding fit in one of the slots 24 in the platform.

All the flanges 36 and 38 are formed integrally with the backing plate 32, and are coined in such a way that the tongues 36b and 38b each have a thickness of more than ¼ inch, preferably about 5/16 inch. Each is provided with a screw threaded bore, respectively 36c and 38c, suitable for receiving a 5/16 inch diameter screw which can thus be used with its maximum thread load capacity.

An additional, optional, locating feature is provided by a pair of axially aligned, protruding keys 40 of generally "V" shaped profile which fit into slots 26 in the platform 14.

Assembly of the parts is illustrated in FIGS. 2, 3 and 4. In FIG. 2, after a brake plate with worn lining has been removed, a brake plate 12 with a new lining is slid over the platform 14 of the brake shoe, until the rear flanges 36 overlie apertures 22, whereupon the flanges 36 are caused to pass through the apertures allowing the backing plate 32 to fully contact the platform 14. The brake plate is then slid further rearwards, causing tongue portions 36b to become wedged under outer edge portions of the platform 14, while inner portions 36a are tightly held by the converging sides of apertures 22. Simultaneously, the inner portion 38b of the front flanges 38 pass into the slots 24 in the front of the platform.

With the bores 36c and 38c in the flanges underlying the bores 18 and 20 at the rear and front of the platform, screws 42 are then inserted through the bores 18 and 20 and into the bores 36a and 38c of the flanges 36 and 38. As seen in FIG. 4, the inner radiused corners 38d provided between the backing plate 32 and the inner flange portion 38a, and between this inner flange portion and the outer flange portion 38b, are pressed against the edges of slots 24 when the screws 42 are tightened, thereby ensuring that both front flanges make solid contact for shear load in both directions. This provides a four point distribution of shear load when the brake is engaged.

The wedging action of the tongues 36b under the rear edge portion of the platform can be enhanced by arranging that the angle of the screw threaded bore 36c is at least 3 degrees from the perpendicular, relative to the tangential plane of the point of contact with the brake shoe, being generally perpendicular to the plane of the tongue 36b. This assists in improving contact between the brake plate and the brake shoe, to improve resistance to shear loads, since the drawing action of the tongues 36b resulting from the tightening of the screws also assists in locking the brake plate to the shoe, by pulling the rear flanges 36 into the apertures 22.

The wedging action of the tongues 36b under the rear edge portion of the platform can also allow the screws 42 for the rear flanges 36 to be dispensed with. The use of screws only at the front flanges 38 makes installation easier, since the front flange is much more easily accessible than the rear flange. In fact, a reasonably satisfactory result can be achieved with no screws or like fasteners being used on either the front or rear flanges, the brake shoe being held in position by the interaction of the rear flanges 36 with the apertures 22, the front flanges 38 with the slots 24, and the interaction of keys 40 in the axial slots 26 in the brake shoe platform.

It is mentioned above that, in this first embodiment, the apertures 22 have sides which converge towards the rear of the platform, and that the inner tongue portions are matched to the aperture dimensions so that these become tightly wedged in the apertures. It has been found that while this arrangement can work for accurately dimensioned platforms, there is a problem in practice which is that the thickness of material used for the platforms is not always accurately consistent. Thus, in practice it is necessary to provide clearances between the flanges and the apertures, with the result that there is movement of the backing plate relative to the platform when the shear force of braking is applied in alternating directions, which with repeated use results in damage and/or failure of the brake plate or platform.

To prevent such damaging movement of the brake plates, it has been found desirable to provide at least one axially extending abutment adjacent the end edge of a brake plate, i.e., the edge connecting the front and rear sides of the brake plate. Preferably, a pair of such abutments is used to prevent circumferential movement of the brake plate in the forward or rearward direction. Preferably also, an abutted pair of brake plates is used, with abutment strips positioned at opposite ends of the brake plate pair.

This preferred arrangement is shown in FIGS. 5 to 8, in which the same reference numerals are used for parts which correspond to those used in FIGS. 1 to 4.

FIGS. 5 to 8 show the presence of axial abutment members which, in this specific embodiment, take the form of strips 50, adjacent the outer end edges of the pair of brake plates 12. Also, it is to be noted that the adjacent or inner ends of the brake plates are butted together. The axial abutment members or strips 50 are positioned so that they resist any substantial movement of the brake plates when subjected to circumferential forces.

Another difference over the design of the first embodiment is that, rather than two adjacent apertures 22 being used to accommodate the adjacent flanges of the two brake plates, these are blended into one aperture 22' which is elongated in the circumferential direction so that it can accommodate the two closely adjacent flanges 38 of the two brake plates. This allows the brake plates to be closely butted together to prevent circumferential movement of the brake plates.

In the arrangement shown, the strips 50 are welded onto the brake platform. However, in an alternative design, these axial abutment members may be formed integrally with the platform, either as upstanding strips or as shoulders at the ends of recesses which receive the backing plate. Whether welded or integrally formed, in each case the strips 50 have a height which brings them flush with the outer surface of the backing plate 32.

It has been found that the sheet material for the brake platform varies in thickness; if this is too thin the screws 42, particularly at the front, tend to lift the brake plates 14 off the outer surface of the shoe platform, causing looseness in the structure. A further embodiment of the invention, shown in FIG. 9 to 10, addresses this problem by connecting the brake plate(s) to the brake platform only by screws inserted through the rear flanges of the brake shoe plates, such flanges being downwardly, outwardly sloping from the rear edges of the rear apertures so that tightening of the screws causes the brake plate to pivot about the rear edges of the rear apertures, thus pressing front portions of the brake plates against the platform.

Figure 9:
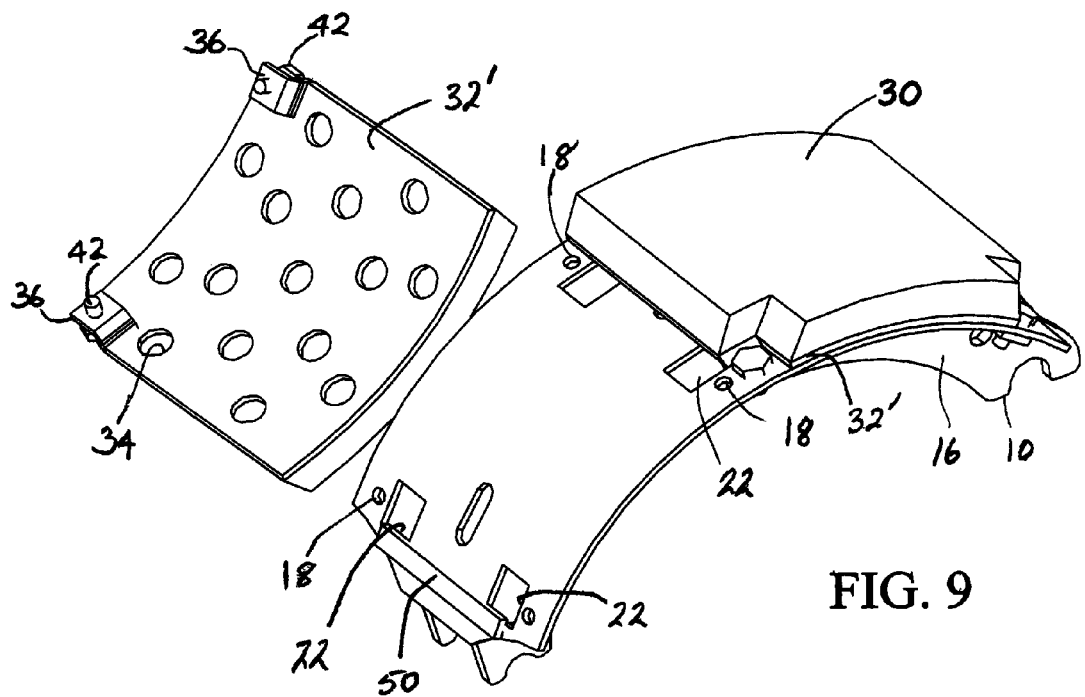
FIG. 9 is perspective view similar to FIG. 5 but of a third embodiment of the invention.
Figure 10:
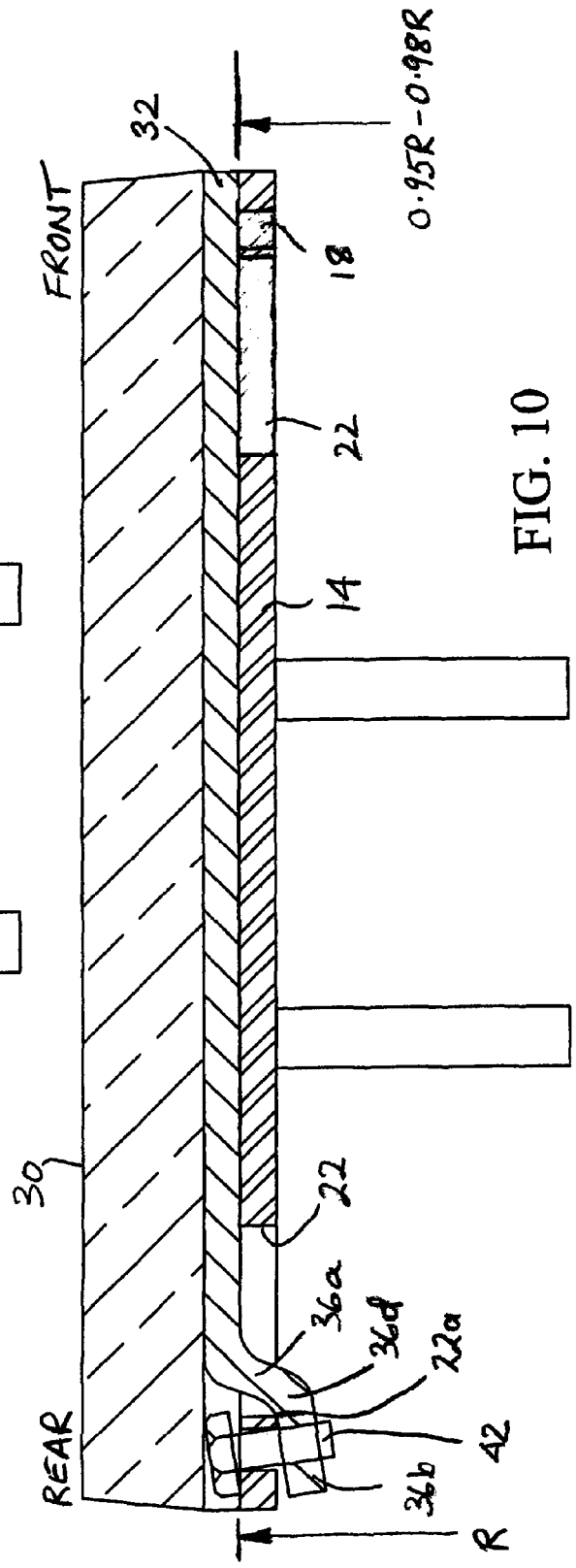
FIG. 10 is a cross-sectional view similar to FIG. 2 but of the third embodiment of the invention.

Thus, the brake plates shown in FIGS. 9 to 10 have backing plates 32' which differ from backing plates 32 (previously described) in that they have neither front attachment screws nor front flanges; they have only rear flanges 36 to fasten them to the brake shoe platform. As before, each rear flange 36 comprises an inner portion 36a depending from the inner surface of said backing plate 32' and a rearwardly projecting outer tongue portion 36b generally parallel to an adjacent area of the backing plate and connected to the inner portion 36a by a curved junction portion 36d which, as the brake plate 32' is being installed, pivots about the adjacent edge 22a of the respective one of the apertures 22 in the brake shoe platform.

The orientations of the portions 36a and 36b of the rear flanges 36 and the tilt angles of the screws 42 are selected so that tightening of the screws 42 causes the brake plate 32' to rotate about the pivots formed by the curved junction portions 36d and their respective aperture edges 22a so that the frontal portions of the brake plate 32' are urged towards the brake shoe platform 14 with sufficient force to obviate the need for additional attachment means (e.g., flanges or screws). This may require the tilt angle to be increased beyond the previously-specified 3 degrees, perhaps to between 6 and 12 degrees.

Figure 11:
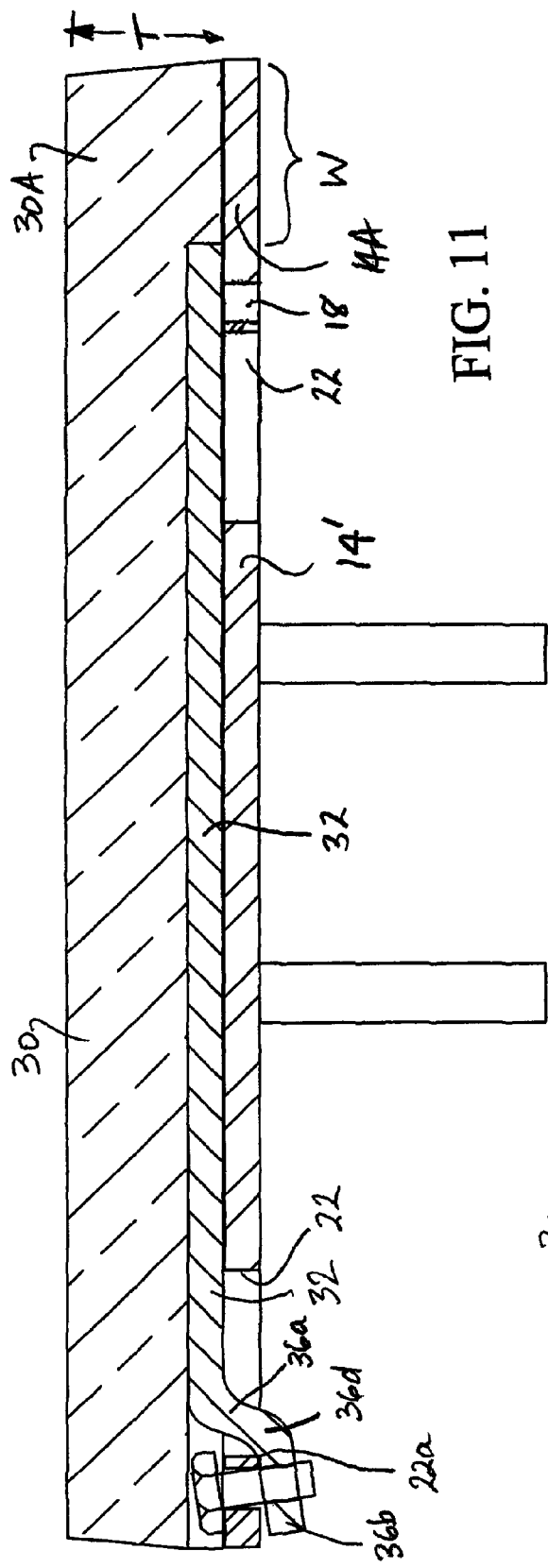
FIG. 11 is a cross-sectional view similar to FIG. 10 but showing a modification applicable to all three embodiments.

In addition, and as illustrated in FIG. 11, the radius of the inner surface of the backing plate 32 reduces from a radius R at the rear edge to a radius in the range from about 0.95R to 0.98R at the front edge, where R is slightly greater than the radius of the outmost surface of the brake shoe platform 14. In practice, it has been found that a backing plate radius R slightly larger than the overall radius of the shoe platform 14 and a front backing plate radius slightly smaller than the overall radius of the platform 14 ensures proper contact between the frontal portions of the brake plate and brake shoe platform, respectively. In a practical example, satisfactory operation was obtained when the radius of the brake shoe platform was 8.125 inches, the radius R at the rear edge of the backing plate 32 was about 8.15 inches and the radius at the front edge of the backing plate 32 was about 8.03 inches. It will be appreciated that these dimensions are not necessarily uniform along the circumference of the backing plate because of manufacturing tolerances. This embodiment also requires that the brake plate 32', be made of steel of sufficient thickness to maintain the structure rigid; in practice, a suitable thickness has been found to be at least 0.14 inches. The width of the flanges 36 also will need to be sufficient to assure the required rigidity. In practice, with 7 or 8 inch brake shoes, a flange width of about 0.75 inches has been found to be sufficient. It will be appreciated that the width should not be increased unduly because there is a trade-off between increasing the width and maintaining sufficient area for friction material.

It should be noted that, in the embodiments of FIGS. 9 to 10, the unused apertures 22 and holes 18 at the front of the brake shoe platform 14 are not superfluous, but rather ensure that the platform 14 is symmetrical and can be reversed yet still accept the new brake plates.

In practice, brake shoe platforms 14 are available in different widths, common widths in North America being 7 inches and 8 inches, for example. FIG. 11 illustrates a modification, applicable to any of the above-described embodiments of the invention, which allows the brake plates 32 (or 32') to be used with wider brake shoe platforms. Thus, in FIG. 11, the brake plate 32' is similar in width to that shown in FIG. 10, but the brake shoe platform 14' is wider by an amount W so that a margin portion 14A projects beyond the edge of the brake plate 14'. The lining material 30 has a corresponding lateral extension 30A which overhangs the brake plate 14' by a similar amount W. The thickness T of the lining material lateral extension 30A is substantially equal to the combined thickness of brake plate 32 and the major portion 30 of the lining material so that, following installation, the lining material lateral extension 30A lies in close proximity to, or even abuts, the projecting portion 14A of brake plate 14.

It will be appreciated that the invention embraces various alternatives and modifications to the above-described embodiments. Thus, although the brake plates shown in FIGS. 9 to 11 have shear load strips 50, they could be omitted in some situations. Likewise, although double or tandem brake plates are common, and perhaps preferred, the invention embraces embodiments as described and shown herein but with only one brake plate.

Industrial Applicability

Embodiments of the present invention provide for brake linings to be replaced without the brake shoe necessarily being removed; and in at least some embodiments it may also be unnecessary for the brake drum to be removed. Embodiments facilitate easy replacement of the brake linings, while attaching these to the brake shoes in a secure manner, and may permit relatively easy retrofitting to existing brake assemblies.

The invention claimed is:

1. A brake assembly of the type having a brake shoe with a generally cylindrically curved platform, and one or more brake plates mounted on the platform, both the platform and the brake plate or plates having generally cylindrically curved front and rear edges, the brake plate or plates each including a brake lining and a backing plate, with the backing plate having an outer surface secured to the lining and having an inner surface attachable to an outer surface of the brake shoe platform, wherein:

said brake shoe platform has a circumferentially spaced series of apertures each adjacent to and spaced inwardly of said rear edge of said platform, and has a series of circumferentially spaced recesses communicating with said front edge of said platform, and in that each said backing plate has:

a) two rear flanges adjacent said rear edge thereof, each rear flange being L-shaped and having an inner portion depending from the inner surface of said backing plate and a rearwardly projecting outer tongue portion generally parallel to an adjacent area of the backing plate, both said outer tongue portions being sized to pass through said apertures in the brake shoe platform; and b) two front flanges adjacent the front edge thereof, each front flange having an inner portion depending from the inner surface of the backing plate and an outer tongue portion generally parallel to an adjacent area of the backing plate;

whereby said brake plate can be assembled to the brake shoe platform by passing said rear flanges through the said apertures in the brake shoe platform and sliding said brake plate rearwardly until said rear flange outer tongue portions underlie portions of the platform adjacent said rear edge while said front flange inner portions enter said recesses and the front flange outer tongue portions slide under portions of the brake shoe platform adjacent said front edge.

2. A brake assembly according to claim 1, wherein said rear flange outer tongue portions slope downwardly and outwardly relative to the axis of curvature of the backing plate, and wherein said rear flanges are dimensioned so as to provide a wedging action under portions adjacent the front edge of the platform, which action holds the backing plate tightly connected to the platform when assembled in place, whereby said brake plate or plates can be installed without the need for fasteners.

3. A brake assembly according to claim 2, wherein said rear flange outer tongue portions slope downwardly and outwardly at an angle of between 2 and 8 degrees relative to the axis of curvature of the backing plate.

4. A brake assembly according to claim 1, wherein said rear flange outer tongue portions slope downwardly and outwardly relative to the axis of the backing plate, and wherein said rear flanges are dimensioned so as to provide a wedging action under the portions adjacent the front edge of the platform, which action holds the backing plate tightly connected to the platform when assembled in place, and wherein at least one of said front flanges and a corresponding front edge portion of the platform are provided with aligned bores for receipt of at least one fastener, whereby said brake plates can be installed with at least one fastener holding a front flange to the platform, but without the need for fasteners for said rear flanges.

5. A brake assembly according to claim 1, wherein said front flanges have their inner portions generally perpendicular to the generally cylindrical surface of the brake shoe platform and are parallel to an axis of curvature of the brake shoe platform, and wherein said recesses communicating with the front edge of the brake shoe platform are slots into which said front flange inner portions can slide to locate the brake plate circumferentially on the shoe.

6. A brake assembly according to claim 1, wherein said backing plate has at least one internally projecting key, and wherein the brake shoe platform has a slot which accommodates each said key when the brake plate is in position.

7. A brake assembly according to claim 1, wherein said circumferentially spaced series of apertures which are adjacent to and spaced from the rear edge of the brake shoe platform have sides which converge inwardly towards the rear of the platform, so that rear edges of said apertures are narrower than front edges thereof and said rear edges are matched to the width of the rear flanges.

8. A brake assembly according to claim 1, wherein said brake shoe platform has at least one axially extending abutment positioned so as to lie close to one end edge of said brake plate when in place on the platform, so as to resist circumferential forces on said brake plate.

9. A brake assembly according to claim 8, wherein each abutment is welded to the brake platform.

10. A brake assembly according to claim 8, wherein each abutment is formed integrally with the brake shoe platform.

11. A brake assembly according to claim 8, wherein the brake shoe platform is wider than the brake plate so that a margin portion of the brake shoe platform projects beyond the edge of the brake plate, and the lining material has a corresponding lateral extension, the thickness of the lining material lateral extension being substantially equal to the combined thickness of the brake plate and the major portion of the lining material so that, following installation, the lining material lateral extension lies in close proximity to, or even abuts, the projecting portion of the brake plate.

12. A brake assembly according to claim 1, wherein said brake shoe platform has two axially extending abutments positioned so as to lie close to opposite end edges of a pair of brake plates when in place on the platform, so as to resist circumferential forces on said brake plates.

13. A brake assembly according to claim 12, wherein said circumferentially spaced apertures adjacent said rear edge of said platform include two outer apertures each sized to receive one of the outermost rear flanges of said pair of brake plates, and an intermediate aperture sized to receive two adjacent rear flanges of the pair of brake plates when butted together with their inner edges in contact.

14. A brake assembly according to claim 1, wherein the brake shoe platform is wider than the brake plate so that a margin portion of the brake shoe platform projects beyond the edge of the brake plate, and the lining material has a corresponding lateral extension, the thickness of the lining material lateral extension being substantially equal to the combined thickness of the brake plate and the major portion of the lining material so that, following installation, the lining material lateral extension lies in close proximity to, or even abuts, the projecting portion of the brake plate.

15. A brake assembly of the type having a brake shoe with a generally cylindrically curved platform and one or more brake plates mounted on the platform, both the platform and the brake plate or plates having generally cylindrically curved front and rear edges, the brake plate or plates each including a brake lining and a backing plate, with the backing plate having an outer surface secured to the lining and having an inner surface attachable to an outer surface of the brake shoe platform, wherein:

said brake shoe platform has a series of first bolt-receiving bores adjacent the rear edge thereof and a series of second bolt receiving bores adjacent the front edge thereof, said brake shoe platform also having a series of apertures each associated with one of said first bolt-receiving bores and each spaced inwardly of one of said first bolt-receiving bores, and having has a series of recesses communicating with said front edge of the platform and each situated adjacent one of said second bolt-receiving bores, and in that each said backing plate has:

a) two rear flanges adjacent said rear edge thereof, each rear flange being L-shaped and having an inner portion depending from the inner surface of said backing plate and a rearwardly projecting outer tongue portion generally parallel to an adjacent rear portion of the backing plate, both of said outer tongue portions being sized to pass through respective ones of said apertures in the brake shoe platform; and b) two front flanges adjacent the front edge thereof, each front flange having an inner portion depending from the inner surface of the backing plate and sized to fit into one of said recesses communicating with the front edge of the platform, and an outer tongue portion generally parallel to an adjacent front edge area of the backing plate;

wherein said outer tongue portions of both the rear and front flanges have screw threaded bores adapted to receive bolts inserted through said bolt receiving bores in the brake shoe platform, whereby said brake plate can be assembled to the shoe by passing said rear flanges through the said apertures in the brake shoe platform and locating said rear flange outer tongue portions under portions of the platform adjacent said rear edge, while also sliding said front flange inner portions into said recesses and locating said front flange outer tongue portions on the underside of the portions of the brake shoe platform adjacent said front edge, and securing all the flanges to the brake shoe platform by means of screws passed through the bores in the brake shoe platform and into said screw threaded bores in the flange outer tongue portions.

16. A brake assembly according to claim 15, wherein all said flanges are integrally formed with the backing plate, and wherein the thickness of the outer portions of the flanges having said threaded bores is at least ¼ inch in thickness, and is thicker than a main portion of the backing plate in contact with the brake lining.

17. A brake assembly according to claim 15, wherein said front flanges have their inner portions generally perpendicular to the generally cylindrical surface of the brake shoe platform and are parallel to an axis of curvature of the brake shoe platform, and wherein said recesses communicating with the front edge of the brake shoe platform are slots into which said front flange inner portions can slide to locate the brake plate circumferentially on the shoe.

18. A brake assembly according to claim 15, wherein said backing plate has at least one internally projecting key, and wherein the brake shoe platform has a slot which accommodates said key when the brake plate is in position.

19. A method for adapting a brake shoe of the type having a brake shoe platform to receive brake plates of the type having a brake lining and a backing plate, the backing plate having a rear edge and a front edge:
a) at least two rear flanges adjacent said rear edge thereof, each rear flange being L-shaped and having an inner portion depending from an inner surface of said backing plate and a rearwardly projecting outer tongue portion generally parallel to an adjacent area of the backing plate, and
b) at least two front flanges adjacent said front edge thereof, each front flange having an inner portion depending from the inner surface of the backing plate and an outer tongue portion projecting generally parallel to an adjacent area of the backing plate;
said method comprising the steps of:
1) forming a series of circumferentially spaced apertures each adjacent to and spaced inwardly of said rear edge of the platform, each said aperture being sized to receive one of said rear flanges, and
2) forming a series of circumferentially spaced recesses each communicating with the front edge of the brake shoe, each said recess being sized to receive an inner outer tongue portion of one of said front flanges.

20. A method according to claim 19, wherein each of said recesses is in the form of a slit sized to receive said inner portion of one of said front flanges when said front flange is orientated parallel to an axis of curvature of the brake shoe platform.

21. A method according to claim 19, further comprising the step of forming, in said brake shoe platform, a first series of bolt receiving bores each situated between one of said apertures and the rear edge of the platform, and forming a second series of bolt receiving bores each situated beside one of said recesses.

22. A brake assembly of the type having a brake shoe with a generally cylindrically curved platform, and a pair of brake plates mounted on the platform, both the platform and the brake plates having generally cylindrically curved front and rear edges, the brake plates each including a brake lining and a backing plate, with the backing plate having an outer surface secured to the lining and having an inner surface attachable to an outer surface of the brake shoe platform, wherein:
said brake shoe platform has a circumferentially spaced series of three apertures each adjacent to and spaced inwardly of said rear edge of said platform, said three apertures including two outer end apertures adjacent outer ends of said platform and a central aperture which is wider than said outer end apertures, and also has a series of circumferentially spaced recesses communicating with said front edge of said platform,
said platform also having two axially extending abutments adjacent the outer ends of the platform and positioned to lie adjacent outer side edges of the said pair of brake plates when in position on said platform,
and in that each said backing plate has:
a) two rear flanges adjacent said rear edge thereof, each rear flange being L-shaped and having an inner portion depending from the inner surface of said backing plate and a rearwardly projecting outer tongue portion generally parallel to an adjacent area of the backing plate, said pair of backing plates having a closely spaced pair of said rear flanges sized to pass through said wider, central aperture and having an end pair of said rear flanges being sized to pass through said outer apertures in the brake shoe platform; and
b) two front flanges adjacent the front edge thereof, each front flange having an inner portion depending from the inner surface of the backing plate and an outer tongue portion projecting generally parallel to an adjacent area of the backing plate;
whereby said pair of brake plates can be assembled to the brake shoe platform by passing said rear flanges through the said apertures in the brake shoe platform and sliding said brake plates rearwardly until said rear flange outer tongue portions underlie portions of the platform adjacent the rear edge while said front flange inner portions enter said recesses and the front flange outer tongue portions slide under portions of the brake shoe platform adjacent the front edge.

23. A brake assembly according to claim 22, wherein at least one of said front flanges and a corresponding front edge portion of the platform are provided with aligned bores for receipt of at least one fastener, whereby said pair of brake plates can be installed with at least one fastener for each brake plate holding a front flange to the platform, but without the need for fasteners for said rear flanges.

24. A brake assembly of the type having a brake shoe with a generally cylindrically curved platform, and at least one brake plate mounted on the platform, both the platform and the brake plate having generally cylindrically curved front and rear edges, the brake plate including a brake lining and a backing plate, with the backing plate having an outer surface secured to the lining and having an inner surface attachable to an outer surface of the brake shoe platform, wherein:

said brake shoe platform has a circumferentially spaced series of apertures each adjacent to and spaced inwardly of said rear edge of said platform, and has a series of bolt receiving bores each adjacent a rear edge of one of said apertures, and in that said backing plate has two rear flanges adjacent said rear edge thereof, each rear flange being L-shaped and having an inner portion depending from the inner surface of said backing plate and a rearwardly projecting outer tongue portion generally parallel to an adjacent area of the backing plate and connected to the inner portion by a curved junction portion, said rear flanges being sized to pass through said apertures in the brake shoe platform, said outer tongue portions of said rear flanges having screw threaded bores adapted to receive bolts inserted through said bolt receiving bores in the brake shoe platform;

whereby said pair of brake plate can be assembled to the brake shoe platform by passing said rear flanges through the said apertures in the brake shoe platform and sliding said brake plate rearwardly until said rear flange outer tongue portions underlie respective portions of the platform adjacent the rear edge and said curved junction portions engage respective juxtaposed edges of the associated apertures to form respective pivots, and securing said rear flanges to said platform by means of screws passed through the bores in the flange outer tongue portions, the arrangement being such that tightening of the screws to draw the rear flange outer tongue portions towards said portions of the platform adjacent the rear edge urges the frontal portion of the brake plate towards the frontal portion of the platform with sufficient force to hold the brake plate without additional front connectors.

25. A brake assembly according to claim 24, wherein said brake shoe platform has at least one axially extending abutment positioned so as to lie close to one end edge of a brake plate when in place on the platform, so as to resist circumferential forces on said brake plate.

26. A brake assembly according to claim 24, wherein said brake shoe platform has two axially extending abutments positioned so as to lie close to opposite end edges of a pair of brake plates when in place on the platform, so as to resist circumferential forces on said brake plates.

27. A brake assembly according to claim 24, wherein each abutment is welded to the brake platform.

28. A brake assembly according to claim 24, wherein each abutment is formed integrally with the brake shoe platform.

29. A brake assembly according to claim 24, wherein said brake shoe platform also has two axially extending abutments adjacent the outer ends of the platform and positioned to lie adjacent outer side edges of the said brake plate when in position on said platform, 30. A brake assembly according to claim 24, further comprising a second brake plate substantially identical to the first-mentioned brake plate and in tandem therewith.

31. A brake assembly according to claim 24, wherein said circumferentially spaced series of apertures which are adjacent to and spaced from the rear edge of the brake shoe platform have sides which converge inwardly towards the rear of the platform, so that rear edges of said apertures are narrower than front edges thereof and said rear edges are matched to the width of the rear flanges.

32. A brake assembly according to claim 24, wherein all said flanges are integrally formed with the backing plate, and wherein the thickness of the outer portions of the flanges having said threaded bores is at least ¼ inch in thickness, and is thicker than a main portion of the backing plate in contact with the brake lining.

33. A brake assembly according to claim 24, wherein each abutment is welded to the brake platform.

34. A brake assembly according to claim 24, wherein each abutment is formed integrally with the brake shoe platform.

35. A brake assembly according to claim 24, wherein said circumferentially spaced apertures adjacent said rear edge of said platform include two outer apertures each sized to receive one of the outermost rear flanges of said pair of brake plates, and an intermediate aperture sized to receive two adjacent rear flanges of the pair of brake plates when butted together with their inner edges in contact.

36. A brake assembly according to claim 24, wherein the outer tongue portion of each rear flanges, when installed in an aperture, slopes downwardly and away from the rear edge of said aperture, whereby said fasteners when tightened tend to pull a front area of the brake plate into contact with a frontal area of the brake shoe platform.

* * * * *